No. 783,241. PATENTED FEB. 21, 1905.
P. BISSET.
TRUCK FOR USE IN TRANSPLANTING TREES.
APPLICATION FILED APR. 20, 1904.
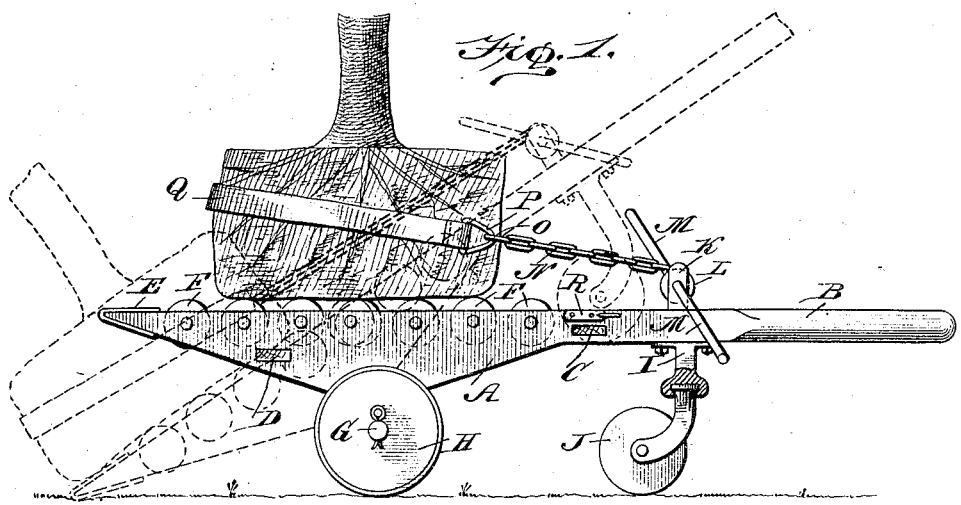
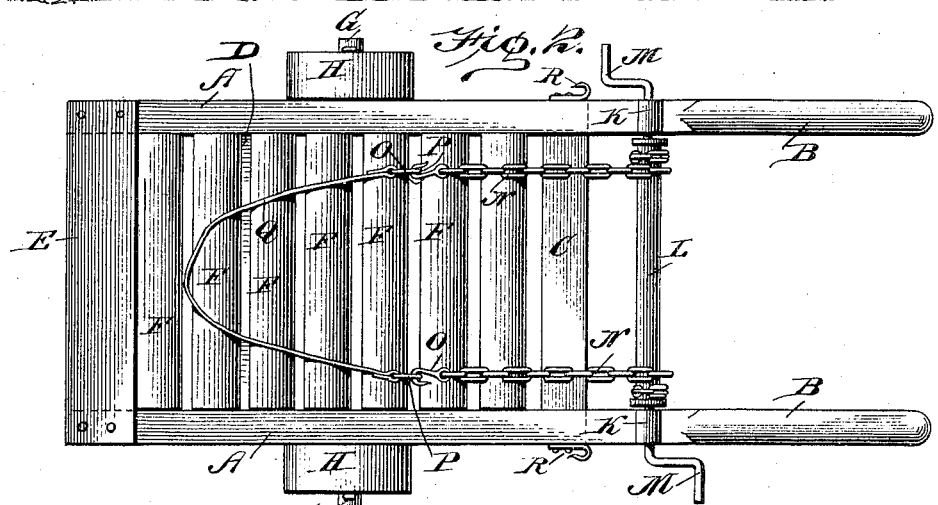
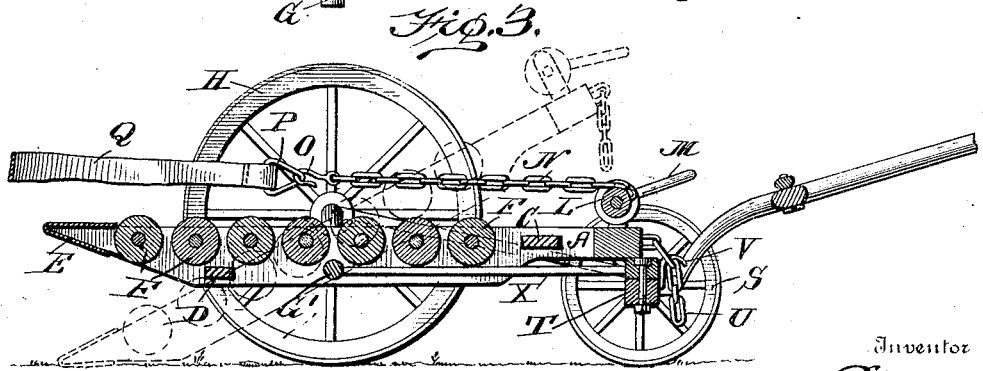

No. 783,241.                                           Patented February 21, 1905.

UNITED STATES PATENT OFFICE.

PETER BISSET, OF WASHINGTON, DISTRICT OF COLUMBIA.

TRUCK FOR USE IN TRANSPLANTING TREES.

SPECIFICATION forming part of Letters Patent No. 783,241, dated February 21, 1905.

Application filed April 20, 1904. Serial No. 204,115.

*To all whom it may concern:*

Be it known that I, PETER BISSET, a citizen of the United States, residing at Twin Oaks, in the city of Washington, District of Columbia, have invented certain new and useful Improvements in Trucks for Use in Transplanting Trees, &c., of which the following is a specification.

My invention relates to an improved apparatus or truck for transplanting trees or shrubbery.

In the tree-transplanting trucks heretofore used it has been customary to turn the tree over the truck and place it thereon in a tilted or horizontal position. This manner of loading trees necessitates, however, supporting means of a rather complicated nature for the tree, and the tree, resting upon the side of the mass of earth surrounding the roots, breaks the earth away from the roots and injures the latter, so that the tree must then be severely cut back. Furthermore, the branches of the tree are likely to be damaged during the turning or while being transported to the place of replanting.

My invention has for its object to provide simple means for loading and unloading the tree and transporting it in a substantially upright position, thus avoiding the disadvantages above described. The said object is attained by the truck illustrated in the annexed drawings, in which—

Figure 1 is a side view of my improved truck. Fig. 2 is a top view; and Fig. 3 is a vertical longitudinal section of a slightly-modified embodiment of my invention.

Referring to Figs. 1 and 2, A represents the side frames of the truck, terminating in handles B. The side frames A are connected by cross-beams C D and taper toward the front, where their tapering ends are connected and strengthened by an angle-plate E, preferably of metal. Journaled in the side frames a plurality of antifriction-rollers F are arranged at short intervals. On axle G, secured to the bottom of the side frames, wheels H are rotatably arranged. The axle G is secured to the frames near the center of gravity of the entire structure in order that the truck may remain in an inclined position when tilted, as later on referred to. Projecting downwardly from the side frames near the handles are brackets I, bearing caster-wheels J. K represents uprights, secured to the rear part of the side frames, in which uprights a windlass-drum L, having crank-handles M, is journaled. To drum L chains N are secured, said chains having hooks O, receiving the loops or rings P of a belt Q. To one end of the truck—for instance, near the handle of the side frames—hooks R are secured for hitching a draft-animal to the truck.

In the embodiment shown in Fig. 3 only the ends of the side frames are tapering, and the wheel-axle G' I is a so-called "drop-axle" to permit the use of large wheels without raising the truck to an inconvenient height. The caster-wheels, with their brackets, are replaced by a pair of wheels S, rotatably secured to axle T, to which the front end of the truck is connected by a king-bolt or fifth-wheel. A chain U, secured to the side frames, and a hook V on axle T permit of the said parts being coupled together. The axle is connected with the axle G by means of a connecting-rod X.

To operate my device, the truck is tilted on the wheels H and the wedge-shaped front part and supporting-wheels are sunk into the trench that has been dug around the tree to be transplanted. The front edge of the angle-plate E is brought in touch with the bottom of the trench, and the belt Q is secured around block of earth surrounding the roots of the tree, and the loops of the belt are secured to the hooks of the windlass-chain. By gradually working the free end of the truck and simultaneously pulling the belt by operating the crank-handles M the tree is made to slide upwardly on the inclined plane, as shown in dotted lines in Fig. 1. The sliding is greatly facilitated by the antifriction-rollers F, on which the tree partly or completely rests. When the tree approaches the center of gravity or the axle G, the truck is tilted to the horizontal position, and the transport can now take place. The tree can then be conveyed to the place of replanting or disposal, whether by pushing or drawing the truck by means of the handles B, or, if the tree is very heavy, by hitching a draft-animal to the truck, in which case the traces are secured in the hooks R and the operator guides the truck through the handles B. In the embodiment shown in Fig. 3 the truck, after being righted, is secured to the front gear by the detachable king-pin and conveyance takes place by hitching an animal in the thills. The unloading of the tree is effected in the reverse manner.

I wish it to be understood that I do not limit myself to the exact details of construction shown and described, as I may make various modifications without departing from the scope of my invention.

I claim—

A transplanting-truck comprising a flat bed having one end tapered to an edge, antifriction-rollers having their journals on the bed below the upper surface thereof, a pair of wheels on which the truck is supported intermediate its ends, permitting the truck to be tilted so that the uppermost plane of the bed may meet the ground, and a windlass mounted at that end of the bed opposite the tapered end and in close proximity to its surface of the bed, effecting a pull in a direction approximately parallel to the upper plane of the bed, a band adapted to pass around the ball of the plant to be transplanted, and winding connections between the ends of the band and the windlass.

The foregoing specification signed this 9th day of April, 1904.

PETER BISSET.

In presence of—
EDWIN S. CLARKSON,
JNO. R. ADAMS.